Patented Oct. 14, 1952

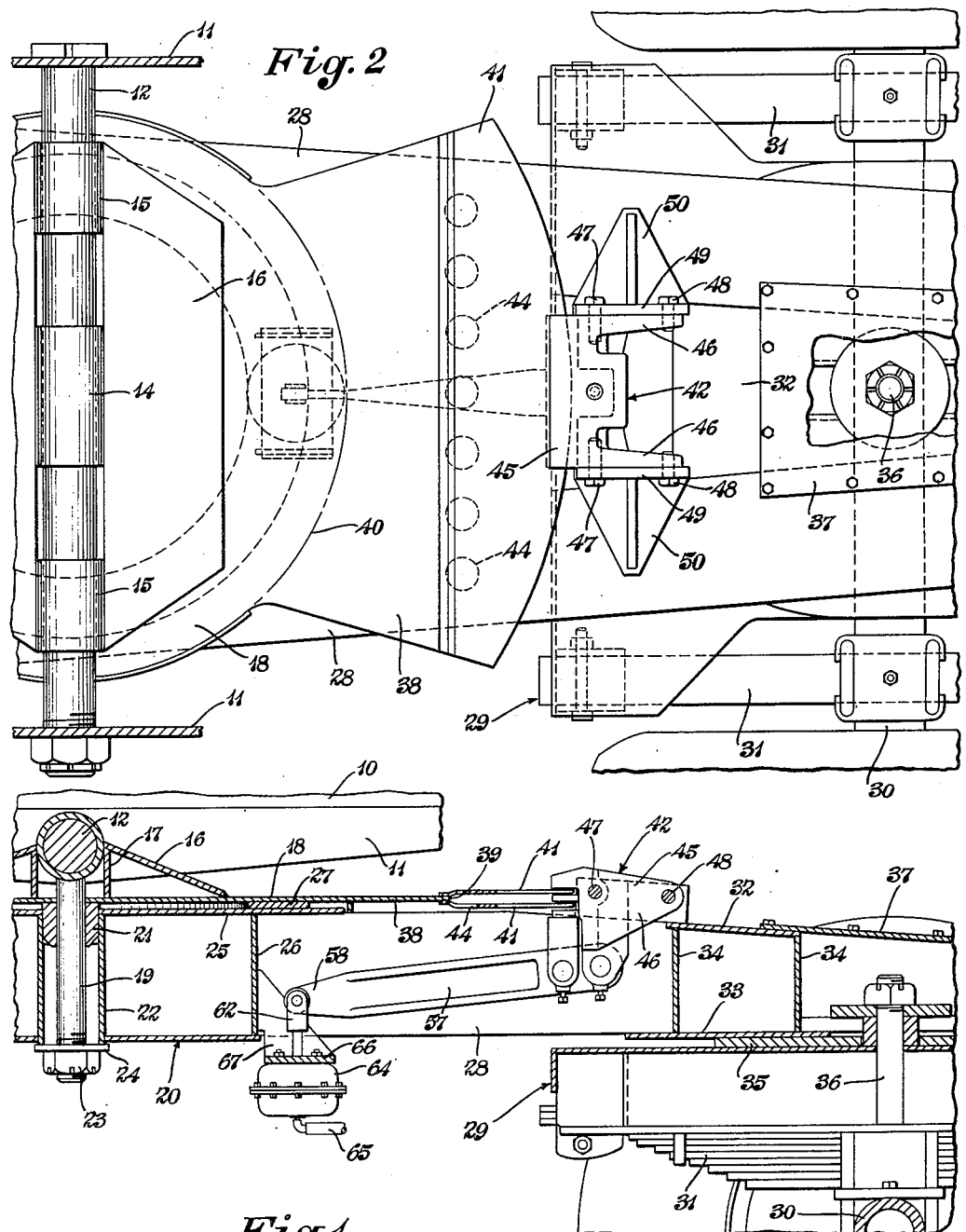

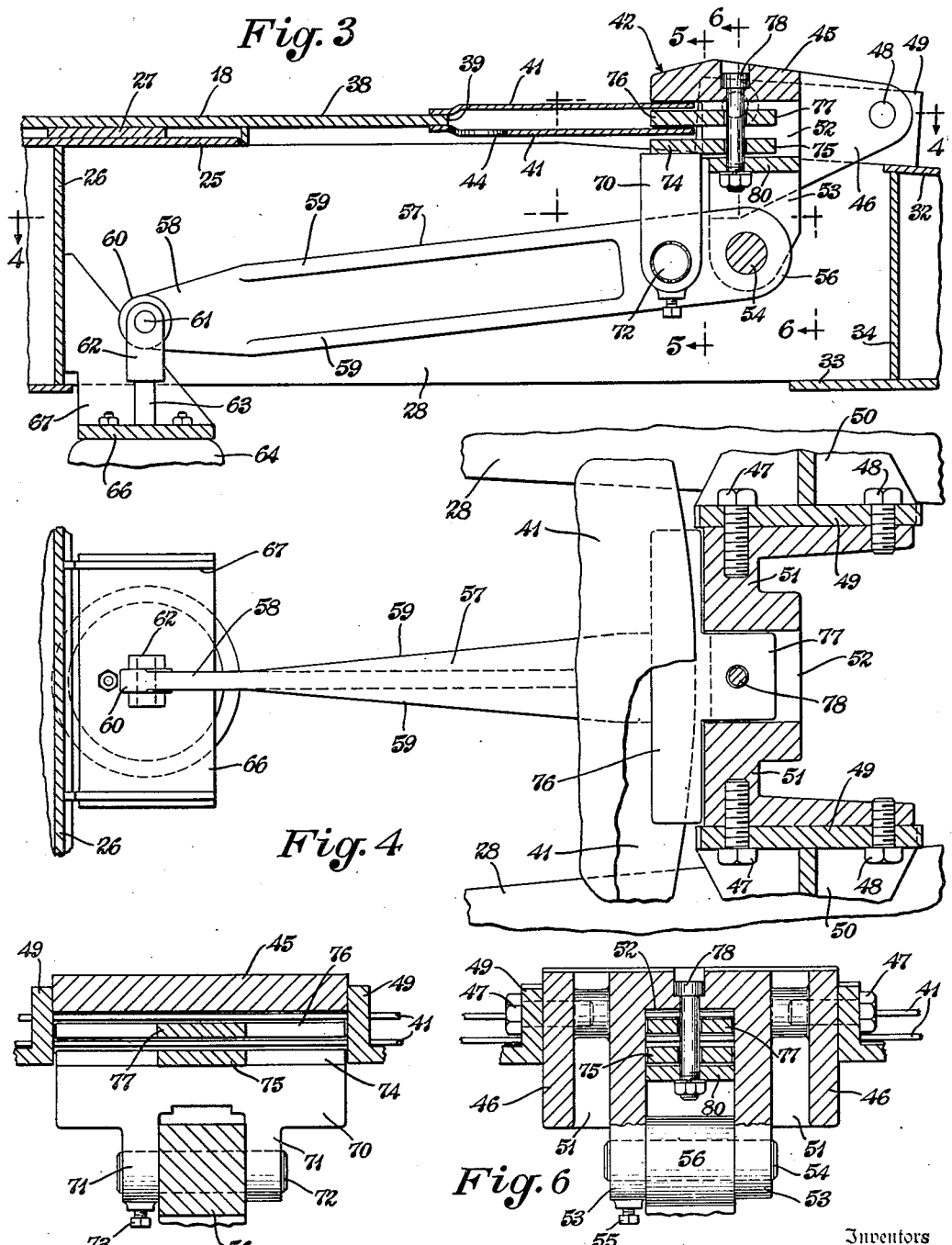

2,613,946

UNITED STATES PATENT OFFICE 2,613,946

BACKING CLAMP FOR TRAILERS

W. Carl Anderson and Sydney L. Dewey, Canton, Ohio, assignors to The Union Metal Manufacturing Company, Canton, Ohio, a corporation of Ohio Application March 23, 1951, Serial No. 217,254

4 Claims. (Cl. 280—33.05)

The invention relates generally to tractor and trailer combinations for transporting heavy loads, and more particularly to a novel clamping mechanism used in backing a tractor and trailer combination of the type shown in U. S. Letters Patent No. 2,466,194, issued April 5, 1949.

The trailer of such a combination has a swiveled undercarriage, and the operation of backing the combination around a curve, as illustrated in Figs. 13–18 and described beginning in line 40 of column 9 of said patent, requires a certain amount of skill and practice on the part of the driver of the vehicle, because of the pivotal connection between the trailer and its undercarriage. Moreover, in backing around curves of various radii or in backing in a substantially straight line, the tractor must be maneuvered differently for each set of conditions or the tractor-trailer combination will "jackknife."

It has been found in actual practice that, after the combination has been started in the general direction in which it is desired to back, if the undercarriage is locked or clamped to the trailer, the backing operation is materially facilitated and requires much less skill and practice on the part of the driver than when the undercarriage is allowed to swivel. However, the clamping means should be adapted to yield somewhat under abnormal turning loads, to prevent damage to the tires in the event the combination "jackknifes" during the backing operation.

It is an object of the present invention to provide novel means for clamping a trailer and its swiveled undercarriage against relative movement during backing.

Another object is to provide novel clamping means adapted to clamp the fifth wheel plate of the trailer and the undercarriage together.

A further object is to provide a novel clamping means applying a predetermined amount of gripping force to the trailer fifth wheel plate so as normally to prevent relative turning of the undercarriage, while permitting some relative turning under abnormal turning force.

A still further object is to provide novel means for frictionally clamping the trailer and its swiveled undercarriage against relative turning movement, said means being operative from the towing vehicle.

These and other objects are accomplished by the parts, improvements, combinations and arrangements comprising the present invention, a preferred embodiment of which is disclosed in the accompanying drawings and described in the specification as exemplifying the best known mode of carrying out the invention; the nature of the invention being set forth in the following general statement; and the scope of the invention being defined in the appended claims.

In general terms, the invention is embodied in means for clamping a trailer body to its swiveled undercarriage to prevent relative movement therebetween, said means comprising an upper jaw fixed on the frame of the undercarriage and a movable lower jaw, said jaws adapted to clamp an extension of the fifth wheel plate, there being a lever operatively connected to the movable jaw and pivoted at one end on the fixed jaw, and power means for actuating the other end of said lever.

Referring to the drawings in which a preferred embodiment is shown by way of example:

Figure 1 is a fragmentary longitudinal sectional view showing the fifth wheel connection between a trailer and its swiveled undercarriage;

Fig. 2 is a fragmentary plan view thereof;

Fig. 3 is an enlarged fragmentary longitudinal sectional view similar to Fig. 1;

Fig. 4 is a plan sectional view as on line 4—4, Fig. 3;

Fig. 5 is a fragmentary sectional view as on line 5—5, Fig. 3; and

Fig. 6 is a fragmentary sectional view as on line 6—6, Fig. 3.

As shown in Figs. 1 and 2, the trailer platform 10 preferably has tapered longitudinal ribs 11 on its underside, and the ribs are carried on the ends of a fifth wheel trunnion 12. The trunnion is journaled in a central bearing 14 and end bearings 15 which are mounted in bracket plates 16 and 17 attached as by welding to the upper fifth wheel plate 18. The central bearing 14 is supported by the upper end of the king bolt 19 which is mounted in the frame of the undercarriage indicated generally at 20.

The king bolt 19 is journaled in a bushing 21 mounted within web plates 22 in the frame 20, and the lower end of the bolt is rotatably clamped against the bottom of said plates by a nut 23 and washer 24. The lower fifth wheel plate 25 is supported on the upper ends of the plates 22 and additional web plates 26 in the undercarriage frame. A bronze bearing ring 27 may be brazed to the lower fifth wheel plate 25 for rotatably supporting the upper fifth wheel plate 18 thereon. Thus the undercarriage frame swivels about the king bolt 19 to allow relative turning in a horizontal plane between the undercarriage and the trailer platform; and at the same time a limited amount of rocking of the carriage in a vertical plane about the trunnion 12 is permitted.

The side members 28 of the undercarriage frame, between which the web plates 22 and 26 are connected, may be tubular and extend forwardly and convergently over a dolly indicated generally at 29, which is resiliently mounted on the front axle 30 of the undercarriage by springs 31. Above the dolly the side members 28 are connected by transverse upper and lower plates 32 and 33, and vertical web plates 34, and the front end of the frame is rotatably supported on the bearing plate 35 of the dolly by means of the pivot bolt 36. A cover plate 37 is detachably connected to the side members 28 above the pivot bolt 36.

The construction of the front end of the undercarriage frame and the dolly 29, and the connections therebetween are described in detail in Patent No. 2,466,194, and need not be further described herein because they form no part of the present invention.

The novel clamping means of the present invention are preferably applied to an extension of the upper fifth wheel plate 18. As shown in Fig. 2, a flared extension plate portion 38 extends forwardly from the upper fifth wheel plate 18, preferably in the same plane, and may terminate in a transverse edge portion 39. The extension portion 38 may be formed integrally with the fifth wheel plate 18, or may be welded on to a circular fifth wheel plate at its arcuate edge as indicated in dot-dash lines at 40 in Fig. 2, which would be the case in the event that the backing clamp is applied to an existing trailer having a standard circular fifth wheel plate.

The extension portion 38 preferably has a pair of vertically spaced resilient sector plates 41 welded to its outer edge portion 39, for extending between the upper and lower jaws of the novel clamp means indicated generally at 42. However, it will be understood that, within the scope of the invention, the portion 38 may be extended continuously to terminate at its outer edge between the jaws of the clamping means. As indicated in Figs. 1 and 2, the lower resilient sector plate 41 is provided with a series of access holes 44 to permit welding the inner end portions of the sector plates to the outer edge 39 of the extension plate, and to permit the escape of mud, dirt, and other foreign material which may enter between sector plates 41.

The upper jaw 45 of the novel clamping means is preferably a casting which is substantially U-shaped in plan, and has outer ears 46 which are rigidly attached by screws 47 and 48 to the vertical flanges 49 of angular brackets 50 secured as by welding on the top surfaces of the side members 28 of the undercarriage frame. The ears 46 are connected by transverse webs 51 to a central rectangular box portion 52 having transversely spaced ears 53 extending downwardly therefrom. A pivot pin 54 is mounted in the ears 53 and held against accidental removal by a set screw 55, and one end 56 portion of an operating lever 57 is journaled on said pin between the ears 53.

The lever 57 preferably tapers laterally inward from the end portion 56 to a vertical flange portion 58 at its other end, there being upper and lower laterally tapered ribs 59 between the ends for reinforcing the lever. The flanged end 58 of the lever is preferably provided with a circular boss 60 carrying a pivot pin 61 to which is connected a clevis 62 preferably attached to the piston rod 63 of a conventional air cylinder 64, although it may be actuated by other power means. The air cylinder 64 is supplied with compressed air with a hose connection 65 from a usual compressed air supply reservoir (not shown). Preferably, the cylinder 64 is attached as by bolting to the flange 66 of a bracket 67 carried on the web plate 26 of the undercarriage frame.

The air supply to the cylinder 64 may be connected to a separate operating valve in the cab of the trailer, or in the alternative, the operator may temporarily disconnect the air supply line to his trailer air brakes, and connect it to the compressed air cylinder 64 during the backing operation, so that it can then be operated from the tractor cab in the same manner as the trailer brakes are normally operated.

The movable lower jaw indicated at 70 preferably has two transversely spaced downwardly extending ears 71 which carry a pivot pin 72 secured in one ear by a set screw 73. The ears 71 straddle the end portion 56 of the lever 57 adjacent to the ears 53, and the lever is pivotally connected to the lower jaw 70 by the pivot pin 72. The upper surface of the lower jaw 70 has a friction shoe 74 secured thereon, which shoe is preferably T-shaped and has a tongue 75 extending slidably into the rectangular opening formed by the box portion 52 of the upper jaw. The friction shoe 74 is adapted to contact the lower surface of the lower sector plate 41.

A spacer shoe 76 having a T-shape identical to the shoe 74, is located between sector plates 41 and has a tongue 77 fitting slidably into the box opening 52. The upper end lower surfaces of the shoe 76 contact the inner surfaces of the sector plates 41 when the clamping jaws are brought together. A guide bolt 78 extends vertically through the box portion 52, and the tongue portions 75 and 77 of the shoes fit loosely on the bolt 78, so that the shoes can float up and down within the box opening. The bottom end of the bolt 78 is secured in a transverse wall 80 forming the bottom wall of the box opening 52.

When the piston rod 63 of the air cylinder 64 is actuated upwardly, the lever 57 pivots about the pin 54 and raises the lower jaw 70. When the lower jaw 70 is raised, the spacer shoe 77 cooperates with the upper and lower jaws and the resilient sector plates so as to frictionally grip the four surfaces of the sector plates with substantially equal pressure. This clamping action grips the sector plates in a manner similar to the gripping action of a friction brake shoe, so as to prevent relative turning of the undercarriage with respect to the trailer platform.

Obviously, if the plate portion 33 were extended between the jaws of the clamp and the resilient plates omitted, then the shoe 77 would also be omitted and the edge of the plate would be clamped between the upper and lower jaws.

The arrangement of the lever arms is correlated to the amount of air pressure so as to produce a predetermined amount of frictional gripping force calculated adequately to prevent relative turning of the undercarriage under normal turning loads, but to permit some slippage between the shoes and the plates when the turning loads become abnormal and exceed the predetermined amount. This predetermined amount is such that some relative turning is permitted before the tires of the undercarriage are slid sufficiently to cause damage, as would be the case if the undercarriage were to jackknife during a backing operation.

In backing a tractor-trailer combination of this type, the operator first maneuvers the tractor sufficiently to get the combination started in the general direction in which he wishes to back, and then operates the air cylinder to actuate the clamp. In other words, if he wants to back in a straight line, he clamps the undercarriage with its wheels aligned with the trailer platform; and if he wants to back in a long curve he first gets the trailer platform turned in that direction and then clamps the undercarriage to the trailer. During the backing operation with the undercarriage clamped to the trailer platform, the operator can still make minor corrections in direction by steering the tractor, but if he observes that the trailer is getting too far off direction at any time, he momentarily releases the clamp and realigns the trailer in the proper direction by steering the tractor.

Thus the novel clamping device provides means operable from the cab of the towing tractor for frictionally clamping the undercarriage of the trailer to the fifth wheel plate to prevent relative turning under normal loads during backing, while permitting some turning under excessive loads.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

We claim:

1. In a trailer having a fifth wheel plate and an undercarriage swiveled thereon, spaced resilient extensions on said plate, means on the undercarriage for frictionally clamping said plate and including upper and lower jaws for engaging the outer surface of said extensions, a floating spacer shoe between said extension for engaging the inner surfaces thereof, means rigidly mounting said upper jaw on said undercarriage, lever means on the undercarriage pivotally connected to said lower jaw, and power means for actuating said lever to clamp the jaws and shoe in superposed relation against the inner and outer surfaces of said resilient extensions.

2. In a trailer having a fifth wheel plate and an undercariage swiveled thereon, spaced resilient extensions on said plate, means on the undercarriage for frictionally clamping said plate and including upper and lower jaws for engaging the outer surfaces of said extensions, a floatiing spacer shoe between said extensions for engaging the inner surfaces thereof, means rigidly mounting said upper jaw on said undercarriage, guide means on said upper jaw movably mounting said spacer shoe, lever means on the undercarriage pivotally connected to said lower jaw, and power means for actuating said lever to clamp the jaws and shoe in superposed relation against the inner and outer surfaces of said resilient extensions.

3. In a trailer having a fifth wheel plate and an undercarriage swiveled thereon, spaced extensions on said plate, means on the undercarriage for frictionally clamping said plate and including upper and lower jaws for engaging the outer surfaces of said extensions, a floating spacer shoe between said extensions for engaging the inner surfaces thereof, means rigidly mounting said upper jaw on said undercarriage, lever means on the undercarriage pivotally connected to said lower jaw, and power means of actuating said lever to clamp the jaws and shoe in superposed relation against the inner and outer surfaces of said extensions.

4. In a trailer having a fifth wheel plate and an undercarriage swiveled thereon, spaced extensions on said plate, means on the undercarriage for frictionally clamping said plate and including upper and lower jaws for engaging the outer surfaces of said extensions, a floating spacer shoe between said extensions for engaging the inner surfaces thereof, means rigidly mounting said upper jaw on said undercarriage, guide means on said upper jaw movably mounting said spacer shoe, lever means on the undercarriage pivotally connected to said lower jaw, and power means for actuating said lever to clamp the jaws and shoe in superposed relation against the inner and outer surfaces of said extensions.

W. CARL ANDERSON.
SYDNEY L. DEWEY.

REFERENCES CITED

The following references are of record in the file of this patent:

UNITED STATES PATENTS

| Number | Name | Date |
|---|---|---|
| 655,562 | Lindstrom | Aug. 7, 1900 |
| 2,466,194 | W. C. Anderson et al. | Apr. 5, 1949 |
| 2,468,705 | Price | Apr. 26, 1949 |